United States Patent [19]

Kao

[11] Patent Number: 5,081,739
[45] Date of Patent: Jan. 21, 1992

[54] SOLDER-REMOVING TOOL

[76] Inventor: James Kao, No. 35, Lane 269, Szu Wei Rd., Panchiao, Taipei Hsien, Taiwan

[21] Appl. No.: 720,631

[22] Filed: Jun. 25, 1991

[51] Int. Cl.$^5$ ............................................. A47L 5/04
[52] U.S. Cl. ..................................... 15/341; 15/344; 228/20
[58] Field of Search ............. 15/341, 344; 228/20 HT

[56] References Cited

U.S. PATENT DOCUMENTS

| | | | |
|---|---|---|---|
| 3,263,889 | 8/1966 | Fortune | 15/341 X |
| 3,818,539 | 6/1974 | Fortune | 228/20 HT X |
| 3,862,468 | 1/1975 | Fortune | 228/20 HT X |
| 4,274,176 | 6/1981 | Undin et al. | 15/341 |
| 4,292,706 | 10/1981 | Fortune | 15/341 |

Primary Examiner—Chris K. Moore
Attorney, Agent, or Firm—Ostrolenk, Faber, Gerb & Soffen

[57] ABSTRACT

A solder-removing tool has a cylinder with a nozzle at one end thereof and a shaft with a piston assembly slidable in the cylinder. A latching assembly is disposed at the other end of the cylinder and latches the shaft in an extended position. A spring is fixed to a spring seat which is received on an annular flange of the cylinder near the latching assembly. A damping assembly employs a floating washer between the latching assembly and the spring seat, and employs a pair of exhaust ports and a compression port respectively formed through the latching assembly and the spring seat. The damping assembly absorbs the shock produced by the recoil of the spring from the extended position.

6 Claims, 5 Drawing Sheets

SOLDER-REMOVING TOOL

BACKGROUND OF THE INVENTION

1. Field of the Invention

The present invention relates to vacuum-operated solder-removing tools.

2. Description of Related Art

Various vacuum-operated solder-removing tools have been previously disclosed. U.S. Pat. No. 4,274,176 to Undin et al. describes such a device including a tubular body with a nozzle at one end thereof, a releasable locking device at the other end, and a piston device therein. The piston device has a piston member mounted on a rod employing a pair of springs.

The main disadvantage of Undin et al. is that it does not provide a shock-absorbing or damping means to absorb, damp, or retard the shock caused by the recoil of the piston device. When the piston device recoils and strikes the releasable locking device, the shock may dislodge some solder that has been drawn into the tubular body, the solder falling back onto the circuit or working space. The shock also makes it difficult to accurately place the solder-removing tool in highly-toleranced circuits, with the shock even jolting the tool into the circuit or a pad thereof. The shock can also decrease the life of the tool.

Another disadvantage of the above invention is that it does not provide adequate sealing between the piston member and the tubular body. Undin et al. provide a resilient sealing disc sandwiched between two retainer discs. By the configuration of the piston member, the resilient sealing disc is subject to accelerated wear due to the differences in the diameters of the discs. Also, it is not guaranteed that the seal between the resilient sealing disc and the piston rod is airtight.

A further disadvantage of the above invention is the provision of two springs. One of the springs, a compression spring, abuts the piston member. This configuration permits the piston member to cock slightly during recoil, thereby possibly reducing the vacuum produced during recoil.

The present invention is directed in eliminating the disadvantages found in the above related art, as well as other related art solder-removing tools.

SUMMARY OF THE INVENTION

The present invention provides a solder-removing tool including a cylinder with a nozzle at one end thereof, containing therein a shaft being releasably slidable in a latching means, a damping means, a spring, and a piston assembly. The piston assembly utilizes a design that employs a pair of rings which respectively-insure an airtight seal between the piston assembly and the cylinder and shaft.

A major design consideration is the provision of the damping means. The damping means absorbs the shock caused by the recoil of the spring. The damping means includes a pair of exhaust ports, a compression port, and a floating washer. The floating washer blocks the exhaust ports, thereby retarding the air flow out of the cylinder. This insures that no solder that has been vacuumed into the cylinder will be dislodged, falling back onto the working space, thereby making the solder-removing operation cleaner and more error-free. This consideration further makes aiming or placing the tool more accurate, where the shock will not jolt the tool. It also increases the life of the solder-removing tool.

A further design consideration is that the piston assembly is secured to the shaft firmly while being able to rotate axially. This minimizes the chances of cocking during recoil and overwear on any specific part of the rings.

The various points of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
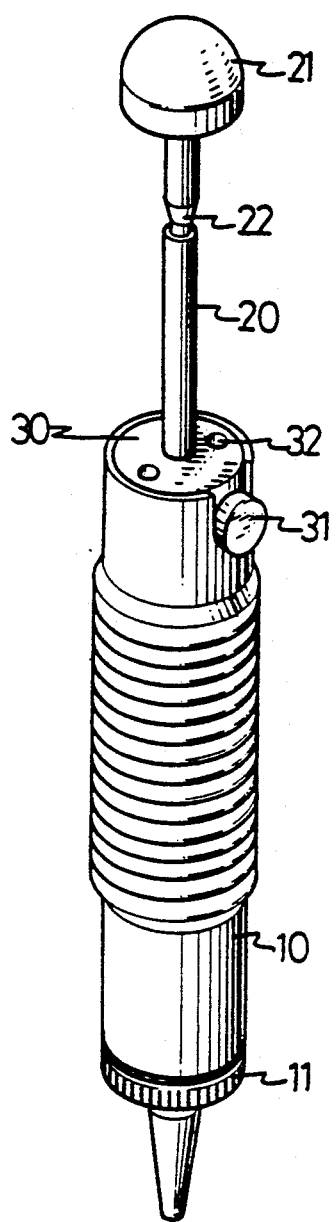
FIG. 1 is a perspective view of a solder-removing tool in accordance with the present invention.
Figure 2:
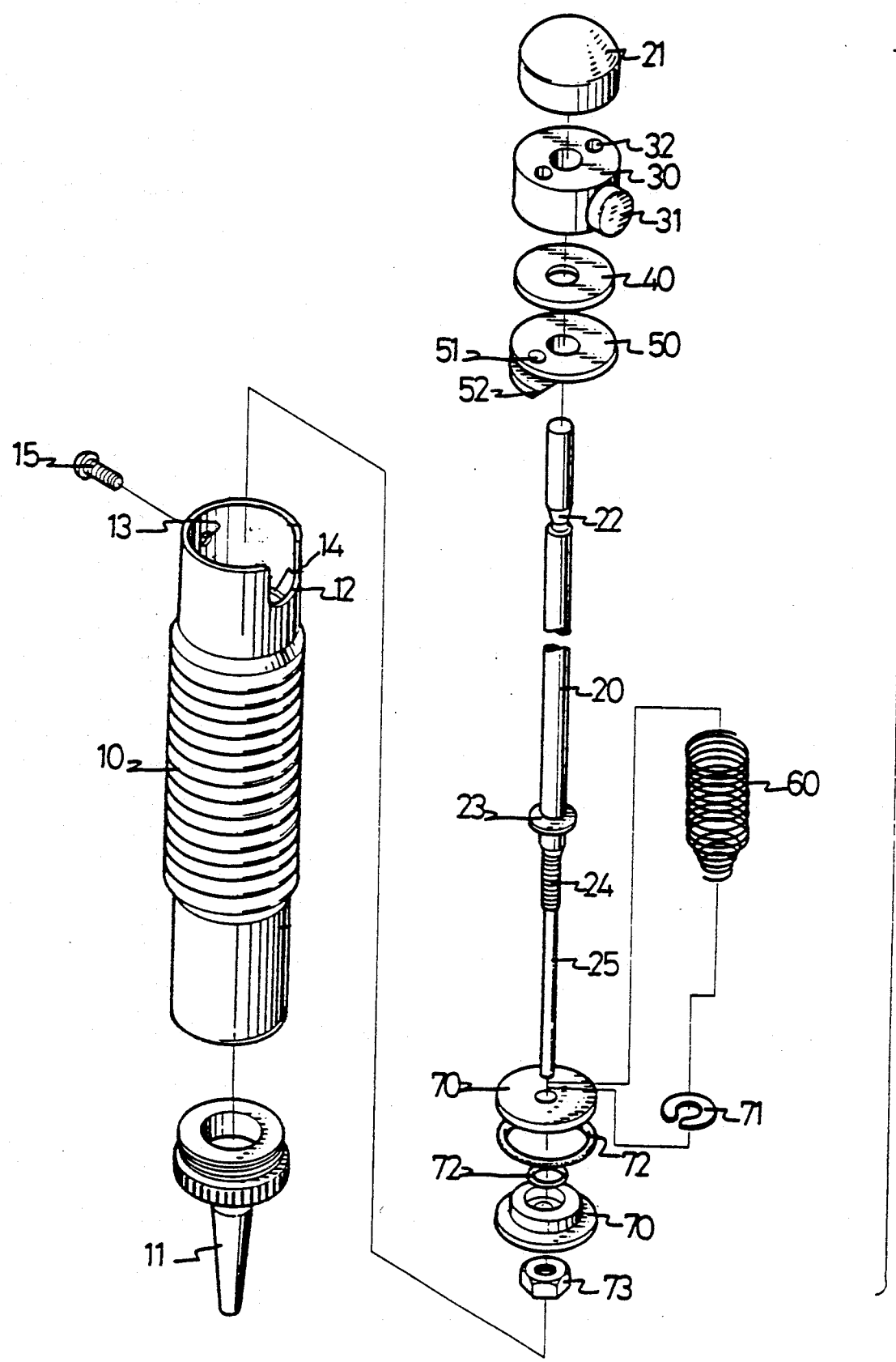
FIG. 2 is an exploded view of the solder-removing tool.

Now referring to the drawings, particularly to FIGS. 1 and 2, wherein a solder-removing tool is shown in a preferred embodiment. The solder-removing tool comprises a cylinder 10 with a nozzle 11 disposed, preferably by threading, in a bottom end thereof and a U-shaped seat 12 in a top end thereof. The nozzle 11 is readily releasable from the cylinder 10 and has a ring seal (not shown) to affect an airtight engagement between the cylinder 10 and the nozzle 11. Also formed in the top end of the cylinder 10 is a through hole 13 and an annular flange 14 The through hole 13 threadingly receives a screw 15, whose function will be discussed later, as will that of the annular flange 14.

The solder-removing tool further comprises a shaft 20 having a cap 21 disposed on an external end thereof. An annular groove 22 is formed in the external end of the shaft 20 near the cap 21. At an internal end of the shaft 20 is an annular stop 23 having a diameter greater than that of the shaft 20. Threading 24 is formed in the internal end of the shaft 20 at a furthest internal portion thereof. A needle 25 is engaged, preferably by threading, with the shaft 20 through a hole (not shown) in the end of the furthest internal portion thereof.

Figure 3:
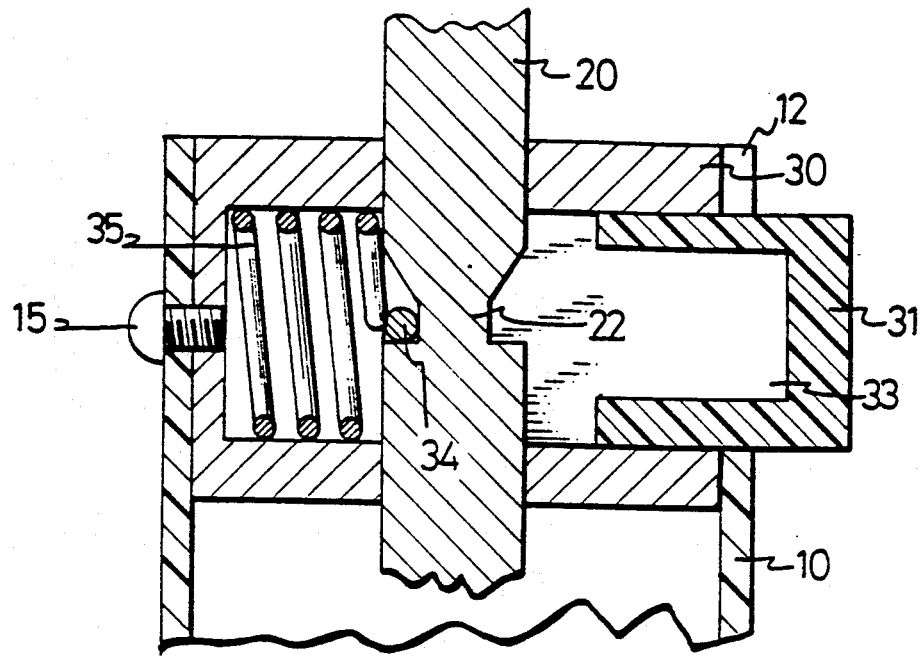
FIG. 3 is a cross-sectional view of a latching means in accordance with the present invention.
Figure 3A:
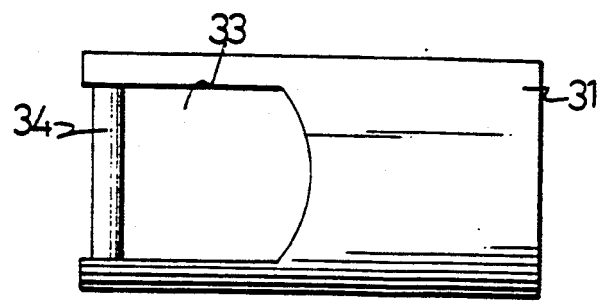
FIG. 3a is a top view of a transverse plug of the latching means of FIG. 3.

With additional reference to FIG. 3, the top end of the cylinder 10 receives a housing 30, which is fixed therein by the screw 15 engaging with the through hole 13 and a threaded hole (not labeled) of the housing 30. A latching means, comprising a housing 30 and a transverse plug 31, shown in detail in FIG. 3a, is slidably disposed on the shaft 20. A pair of exhaust ports 32 (only shown in FIG. 1) are formed longitudinally through the housing 30, which will be discussed later The transverse plug 31 comprises a recess 33 formed therein and a cross pin 34 fixed thereto. The transverse plug 31 is received by the seat 12 and is slidable thereon. A compression spring 35 constantly urges the transverse plug 31 outward, thereby constantly urging the cross pin 34 to slidingly contact the shaft 20, so that when the shaft 20 moves longitudinally downward, the cross pin 34 will be received by the annular groove 22 of the shaft 20, thereby preventing any longitudinal upward movement thereof. To allow upward movement, the transverse plug 31 is depressed inward, thereby moving the cross pin 34 out of the annular groove 22.

Exclusively referencing FIG. 2, a damping means is slidably disposed on the shaft 20 in the top end of the cylinder 10, comprising a floating washer 40 having a diameter slightly less than the inner diameter of the cylinder 10 and a spring seat 50 having a compression port 51 formed therethrough. The floating washer 40 is able to block the exhaust ports 32 and the compression port 51. The exhaust ports 32, the floating washer 40, the spring seat 50, and the compression port 51 generally comprise the damping means. The spring seat 50 also has an annular ramp 52 for receiving a spring 60 thereon. When the spring 60 is placed around the shaft 20, a conical end thereof catches on the annular stop 23, thereby retaining the conical end.

A piston assembly 70 is disposed on the shaft 20 at the bottom end thereof. The piston assembly 70 comprises a first plate abutting a clip 71 and a second plate abutting a nut 73 engage with the threading 24. It should be known that the conical end of the spring 60 between the annular stop 23 and the clip 71 does not apply any force to the piston assembly The second plate of the piston assembly 70 has a ring flange formed thereon for receiving a pair of rings 72: one on the inside thereof, insuring an airtight seal therebetween the shaft 20, and one on the outside thereof, insuring an airtight seal therebetween the cylinder 10 To further maximize the sealing effect, a suitable sealing grease may be use to coat the two rings 72. The two plates of the piston assembly 70 sandwich the rings 72, thereby forming an effective airtight piston. It should be known that the piston assembly 70 rotates axially on the shaft 20, not being fixed thereto, and that the plates thereof are seamless, thereby maximizing the sealing effect.

Figure 4:
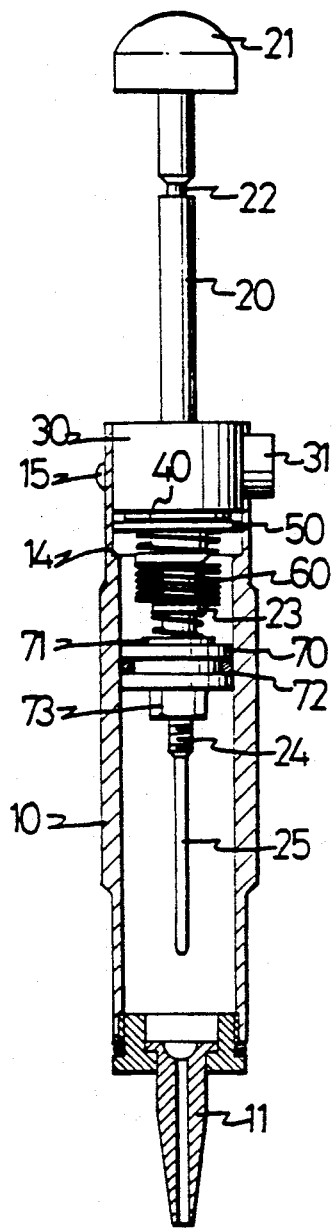
FIG. 4 is a partial cross-sectional view of the solder-removing tool shown in a recoiled position.

FIG. 4 shows the solder-removing tool assembled and in a recoiled (at rest) position. It can be seen that the annular groove 22 of the shaft 20 has not engaged with the transverse plug 31 of the latching means. The difference in diameters of the floating washer 40 and the cylinder 10 can also be seen. Note that the spring 60, with the conical end thereof retained by the annular stop 23, is in a recoiled (at rest) status. Also note the airtight seal between the piston assembly 70, with the rings 72, and cylinder 10.

Figure 5:
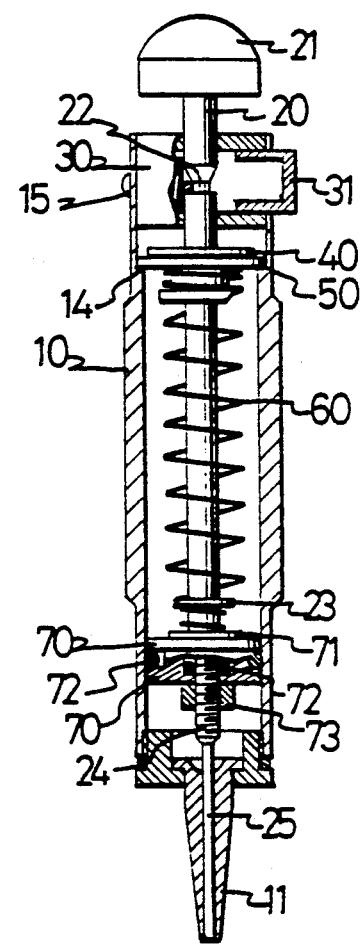
FIG. 5 is a partial cross-sectional view of the solder-removing tool, with a piston and the latching means partially cut away, shown in an extended position.

Now referring to FIG. 5, the soldering-removing tool is shown in an extended position. As the shaft 20 is inserted longitudinally downward, air enters the cylinder 10 through the exhaust ports 32 and compression port 51, and the needle 25 inserts into the nozzle 11. The spring seat 50 is retained by the annular flange 14 on the inside of the cylinder 10; therefore, the spring 60 is extended as the annular stop 23 carries the spring 60 downward When the annular groove 22 meets the cross pin 34, the compression spring 35 urges the cross pin 34 therein, thereby retaining the shaft 20 in an extended position, storing energy in the spring 60.

From the extended position shown is FIG. 5, the solder-removing tool is now ready to perform solder removal The nozzle 11 is positioned proximate to the solder desired to be removed, and the transverse plug 31 is depressed, allowing the spring 60 to recoil.

Figure 6:
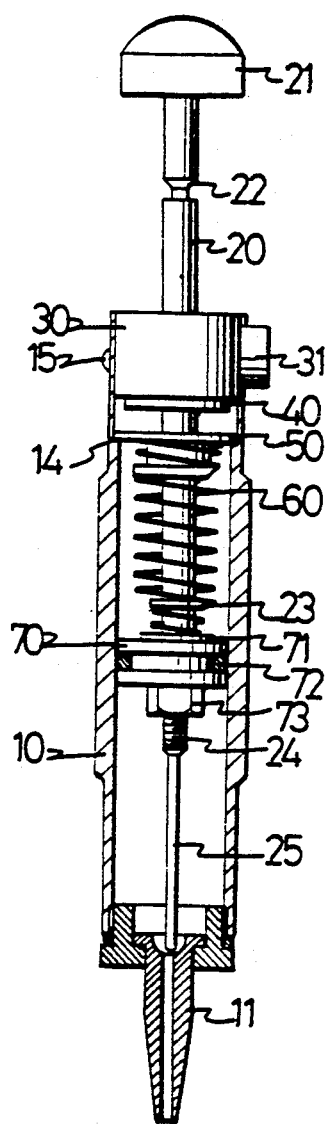
FIG. 6 is a view similar to FIG. 4, showing the solder-removing tool in a recoiling position, wherein an damping means is absorbing shock.

FIG. 6 shows the solder-removing tool in such a recoiling position. As the spring 60 draws the shaft 20 and piston assembly 70 upward, suction will be created in the bottom end of the cylinder 10, thereby drawing solder into the cylinder 10. Also during recoil, air within the cylinder 10 between the piston assembly 70 and the spring seat 50 of the damping means is forced through the compression port 51, urging the floating washer 40 upward. The air then is forced through the exhaust ports 32 (cf. FIGS. 1 and 2), drawing the floating washer 40 further upward, becoming flush with the bottom of the housing 30, thereby retarding the flow of air out of the cylinder 10 in an intermittent fashion. The above action damps the recoil of the spring 60, absorbing the shock caused by the shaft 20 and piston assembly 70 recoiling. This damping minimizes the risk of (1) any solder that has been drawn into the cylinder 10 from being dislodged and falling back onto the working space and (2) damaging a circuit or a pad thereof by allowing the solder-removing tool to be easily aimed without the jolt caused by a shock. It also extends the life of the solder-removing tool.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A solder-removing tool, comprising:
    a cylinder having a nozzle disposed in a bottom end thereof, a seat in a top end thereof, and an annular flange formed in an inside periphery below said seat;
    a shaft with a cap on a first end thereof having an annular groove formed therein near said cap;
    a housing being fixed in said top end of said cylinder and having an inner chamber;
    a latching means for latching said shaft in an extended position by means of said annular groove, said latching means being received by said seat and contained within said inner chamber of said housing;
    a piston assembly being fixed to said shaft at a second end thereof;
    a spring seat being disposed around said shaft and retained by said annular flange;
    a spring being disposed around said shaft and received by said spring seat at a first end thereof and fixed to said shaft at a second end thereof; and
    a damping means for absorbing recoil shock being disposed between said spring seat and said housing.

2. The solder-removing tool as claimed in claim 1, wherein said piston assembly comprises a pair of plates and a pair of rings; one said plate has a raised flange formed concentrically thereon; one said ring is disposed inside said raised flange, and the other said ring is disposed around said flange, so that when said plates sandwich said rings therebetween, an airtight seal is formed between said piston assembly and said shaft and cylinder.

3. The solder-removing tool as claimed in claim 2, wherein said shaft has threading formed in said second end thereof and a retaining means, so that said piston assembly abuts said retaining means and is secured to said shaft by a nut engaged with said threading.

4. The solder-removing tool as claimed in claim 1, wherein said latching means comprises: a transverse plug being slidably received in said inner chamber of said housing and extending external to said cylinder in said seat and having a recess formed therein for accommodating said shaft; a cross pin being fixed to said transverse plug; and a compression spring being compressed between said transverse plug and an internal end of said chamber, so that said cross pin is constantly urged against said shaft.

5. The solder-removing tool as claimed in claim 1, wherein said damping means comprises: a floating washer being disposed around said shaft and having a diameter slightly less than an inner diameter of said top end of said cylinder; at least one exhaust port being longitudinally formed through said housing; and at least one compression port being formed through said spring seat; said floating washer is able to block said ports, so that when said spring is recoiling from said extended position, drawing said piston assembly upward and compressing air contain within said cylinder, air is forced through said compression port, urging said floating washer to block said exhaust port intermittently, said ports limiting the flow rate of air escaping.

6. The solder-removing tool as claimed in claim 1, wherein said shaft has an annular stop in said second end thereof and said spring as a conical second end, said annular stop retains said second end of said spring, fixing said spring to said shaft, so that said second end of said spring does not apply any force to said piston assembly.

* * * * *